United States Patent
Tumuluru

(10) Patent No.: US 10,681,131 B2
(45) Date of Patent: Jun. 9, 2020

(54) SOURCE NETWORK ADDRESS TRANSLATION DETECTION AND DYNAMIC TUNNEL CREATION

(71) Applicant: VMware, Inc., Palo Alto, CA (US)

(72) Inventor: Laxminarayana Tumuluru, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 106 days.

(21) Appl. No.: 15/586,225

(22) Filed: May 3, 2017

(65) Prior Publication Data

US 2018/0063077 A1 Mar. 1, 2018

Related U.S. Application Data

(60) Provisional application No. 62/380,993, filed on Aug. 29, 2016.

(51) Int. Cl.
*H04L 29/06* (2006.01)
*H04L 29/08* (2006.01)
(Continued)

(52) U.S. Cl.
CPC ............ *H04L 67/1097* (2013.01); *G06F 8/65* (2013.01); *G06F 9/5027* (2013.01); *G06F 9/5044* (2013.01); *G06F 9/5061* (2013.01); *G06F 9/5077* (2013.01); *H04L 12/4633* (2013.01); *H04L 41/082* (2013.01); *H04L 41/0803* (2013.01); *H04L 43/103* (2013.01); *H04L 45/72* (2013.01); *H04L 47/12* (2013.01); *H04L 47/825* (2013.01); *H04L 49/354* (2013.01); *H04L 49/70* (2013.01); *H04L 61/2007* (2013.01); *H04L 61/2592* (2013.01); *H04L 63/029* (2013.01); *H04L 63/0272* (2013.01); *H04L 67/10* (2013.01); *H04L 69/16* (2013.01); *H04L 69/22* (2013.01); *H04L 69/324* (2013.01); *H04W 28/0273* (2013.01); *H04W 28/0289* (2013.01);
(Continued)

(58) Field of Classification Search
CPC . H04L 61/2592; H04L 61/2007; H04L 69/16; G06F 8/65
USPC ........................................................ 713/168
See application file for complete search history.

(56) References Cited

U.S. PATENT DOCUMENTS

2003/0088421 A1 5/2003 Maes et al.
2003/0191834 A1 10/2003 Steegmans
(Continued)

*Primary Examiner* — Evans Desrosiers
(74) *Attorney, Agent, or Firm* — Patterson + Sheridan, LLP

(57) ABSTRACT

An approach is disclosed for detecting source network address translation in internet protocol (IP) tunneling flows and using learned source IP addresses and source ports from such detection to create new tunnels. In one embodiment, a NAT detection application determines whether source IP addresses and source ports associated with new traffic flows destined to a local Foo-over-UDP (FOU) tunnel endpoint match the source IP address and source port of a previously configured FOU tunnel. Lack of such a match is indicative of source network address translation, and in such a case the NAT detection application creates a new FOU tunnel toward the detected source IP address and source port. In addition, the NAT detection application authenticates the remote endpoint of the newly created FOU tunnel and configures the FOU tunnel for use if the remote endpoint is successfully authenticated.

20 Claims, 4 Drawing Sheets

(51) Int. Cl.

| | | |
|---|---|---|
| *H04L 29/12* | (2006.01) | |
| *G06F 8/65* | (2018.01) | |
| *H04L 12/24* | (2006.01) | |
| *G06F 9/50* | (2006.01) | |
| *H04L 12/801* | (2013.01) | |
| *H04L 12/911* | (2013.01) | |
| *H04W 28/02* | (2009.01) | |
| *H04L 12/931* | (2013.01) | |
| *H04L 12/46* | (2006.01) | |
| *H04L 12/26* | (2006.01) | |
| *H04L 12/721* | (2013.01) | |
| *H04L 12/715* | (2013.01) | |
| *H04L 12/725* | (2013.01) | |
| *G06F 9/455* | (2018.01) | |

(52) U.S. Cl.
CPC ...... *G06F 2009/4557* (2013.01); *H04L 45/04* (2013.01); *H04L 45/302* (2013.01); *H04L 47/10* (2013.01); *H04L 61/2061* (2013.01); *H04L 61/6022* (2013.01); *H04W 28/02* (2013.01); *H04W 28/0284* (2013.01)

(56) References Cited

U.S. PATENT DOCUMENTS

| | | |
|---|---|---|
| 2004/0081091 A1 | 4/2004 | Widmer et al. |
| 2007/0280243 A1 | 12/2007 | Wray et al. |
| 2008/0031149 A1 | 2/2008 | Hughes et al. |
| 2008/0138067 A1 | 6/2008 | Beshai |
| 2009/0113203 A1* | 4/2009 | Tsuge ................ H04L 29/12377 713/151 |
| 2011/0044438 A1 | 2/2011 | Wang et al. |
| 2012/0087313 A1* | 4/2012 | Yin ....................... H04W 48/16 370/328 |
| 2013/0016612 A1 | 1/2013 | Vasseur et al. |
| 2013/0044764 A1 | 2/2013 | Casado et al. |
| 2013/0070654 A1 | 3/2013 | Nishimura |
| 2013/0083701 A1 | 4/2013 | Tomic et al. |
| 2013/0128786 A1 | 5/2013 | Sultan et al. |
| 2013/0263125 A1 | 10/2013 | Shamsee et al. |
| 2013/0305311 A1 | 11/2013 | Naga et al. |
| 2014/0105015 A1 | 4/2014 | Hui et al. |
| 2014/0108722 A1 | 4/2014 | Lipchuk et al. |
| 2014/0133302 A1 | 5/2014 | Fu et al. |
| 2014/0320500 A1 | 10/2014 | Fletcher et al. |
| 2015/0249565 A1 | 9/2015 | Yamabe et al. |
| 2015/0281078 A1 | 10/2015 | Luo et al. |
| 2016/0094364 A1 | 3/2016 | Subramaniyam et al. |
| 2016/0349993 A1 | 12/2016 | Udupi et al. |
| 2017/0093754 A1 | 3/2017 | Zhang et al. |
| 2017/0257309 A1 | 9/2017 | Appanna |
| 2018/0006935 A1 | 1/2018 | Mutnuru et al. |
| 2018/0062920 A1 | 3/2018 | Srinivasan et al. |
| 2018/0063074 A1 | 3/2018 | Shankarappa et al. |
| 2018/0063077 A1 | 3/2018 | Tumuluru |
| 2018/0063743 A1 | 3/2018 | Tumuluru et al. |
| 2018/0069924 A1 | 3/2018 | Tumuluru et al. |

* cited by examiner

SOURCE NETWORK ADDRESS TRANSLATION DETECTION AND DYNAMIC TUNNEL CREATION

CROSS-REFERENCE TO RELATED APPLICATIONS

This application claims benefit of U.S. Provisional Patent Application No. 62/380,993, filed Aug. 29, 2016, which is incorporated herein by reference in its entirety.

BACKGROUND

Tunneling is a technique of encapsulating packets constructed in one network protocol format within another protocol for transmission over a network, such that the packets being encapsulated appear as data to the network. For instance, Foo-over-UDP (FOU) is a unidirectional user datagram protocol (UDP) header encapsulation/tunneling mechanism. Any Internet Protocol (IP) packet can be encapsulated using FOU, and the FOU UDP encapsulation can provide advantages such as Network Overlay creation, hardware/software optimizations such as Receive Side Scaling (RSS) and Equal Cost Multipath (ECMP) routing, UDP checksum offload, etc.

Some tunneling mechanisms such as FOU are stateless, meaning that no information is maintained at a local tunnel endpoint about the state or availability of the remote tunnel endpoint. FOU also lacks a control plane, which would otherwise be responsible for managing the FOU tunnels (e.g., by establishing authenticated connections, and the like). Instead, FOU tunnels are typically configured statically based on, e.g., configuration information input by a user.

Source network address translation (SNAT) is a technique of translating source IP addresses and/or source ports in packet headers to other IP addresses and/or ports. For example, a router's firewall may convert private IP addresses contained in packets sent from devices on a private network to public IP addresses when those packets pass through the firewall to a public network. With tunneling mechanisms such as FOU that are stateless and lack a control plane, tunnel endpoints receiving SNATed FOU traffic are traditionally unable to recognize the SNATing and respond back to the translated IP address and/or port.

SUMMARY

One embodiment provides, at an endpoint having a first tunnel configured to receive communication from another endpoint, a method for dynamically creating a second tunnel, comprising: determining at least one of a source Internet Protocol (IP) address or a source port associated with a traffic flow received from a remote endpoint does not match a source IP address or a source port, respectively, of the first tunnel; creating the second tunnel to the remote endpoint, wherein packets transmitted through the second tunnel are encapsulated with a header which includes the source IP address associated with the traffic flow as a destination IP address and the source port associated with the traffic flow as a destination source port; and authenticating the remote endpoint.

Further embodiments provide a non-transitory computer-readable medium that includes instructions that, when executed, enable a computer to implement one or more aspects of the above method, and a computer system programmed to implement one or more aspects of the above method.

DETAILED DESCRIPTION

Embodiments disclosed herein provide techniques for detecting source network address translation (SNAT) in Internet Protocol (IP) tunneling flows and dynamically creating new tunnels using learned source IP addresses and source ports. Foo-over-UDP (FOU) tunnels are used herein as an example of IP tunnels, but it should be understood that techniques disclosed herein are also applicable to other types of tunnels. In one embodiment, a network address translation (NAT) detection application determines whether source IP addresses and source ports associated with new traffic flows destined to a local FOU tunnel endpoint match the source IP address and source port of a previously configured FOU tunnel. This assumes FOU tunnel(s) have been configured based on, e.g., configuration information including internal IP addresses and ports of tunnel endpoints that are entered by a user into a management application. If the source IP address and/or source port of a new traffic flow destined to the local FOU tunnel endpoint does not match the previously configured FOU tunnel, this may be indicative of SNATing. In such a case, the NAT detection application creates a new FOU tunnel toward the detected source IP address and source port. It should be understood that the NAT device will translate the destination IP address and destination port of packets sent through such a FOU tunnel back to the internal IP address and port of the remote tunnel endpoint, such that the remote endpoint is reachable via the FOU tunnel. In addition, the NAT detection application authenticates the remote endpoint of the newly created FOU tunnel. If the remote endpoint is successfully authenticated, the NAT detection application configures the FOU tunnel for use.

Figure 1A:
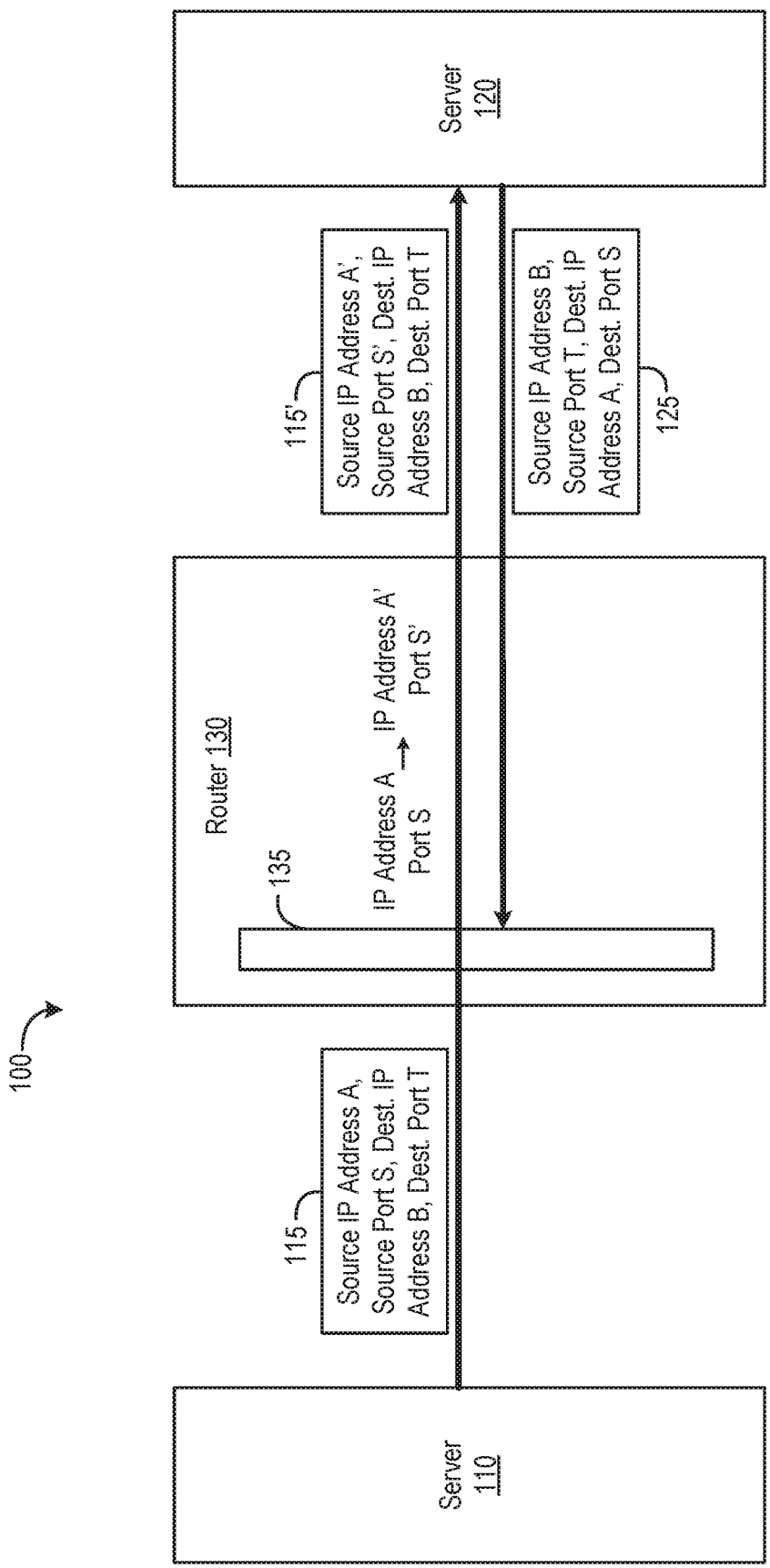
FIGS. 1A-1B illustrate block diagrams of a computing system in which one or more embodiments may be implemented.
Figure 1B:
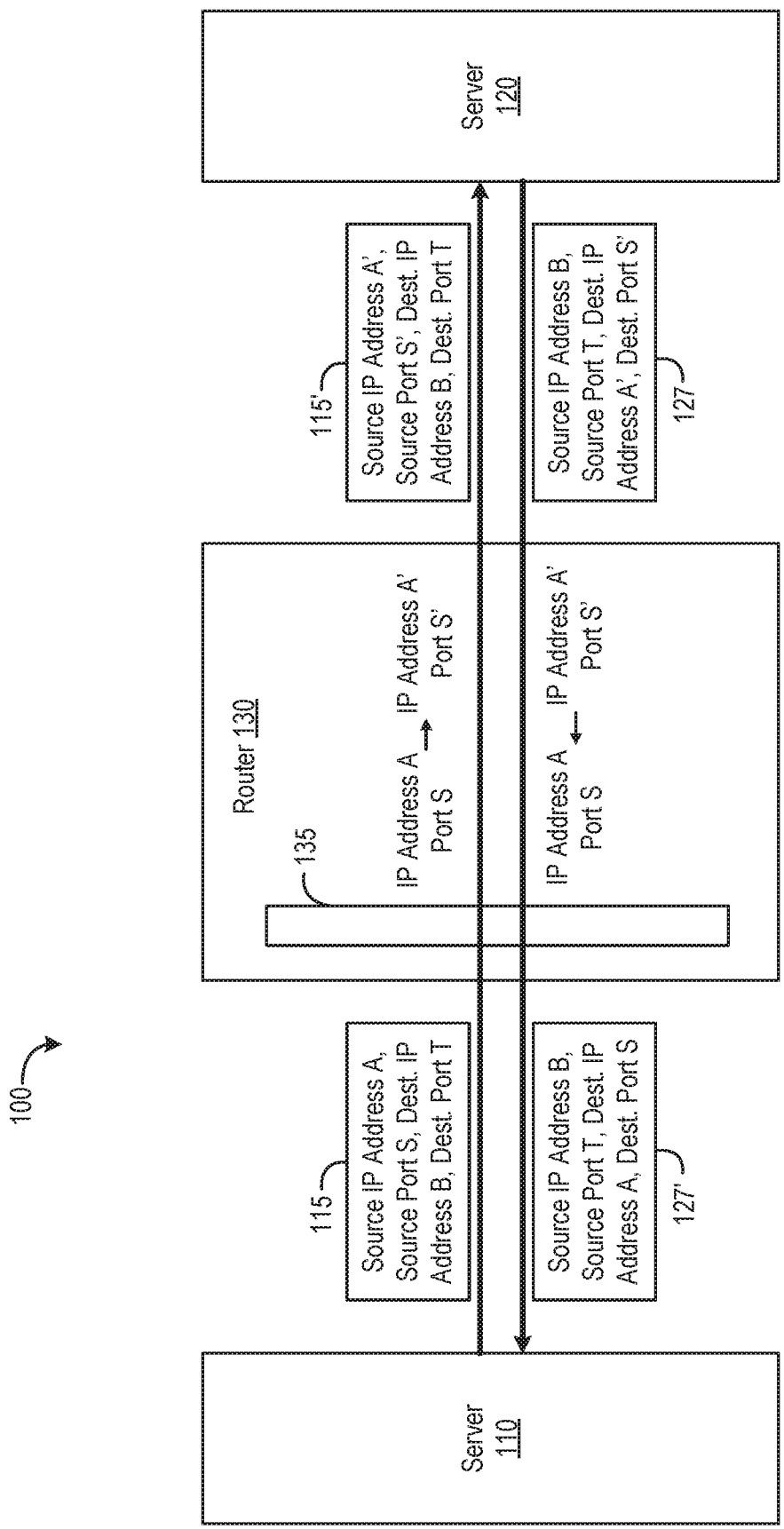

FIGS. 1A-1B illustrate block diagrams of a computing system 100 in which one or more embodiments may be implemented. As shown in FIG. 1A, servers 110 and 120 are in communication over a network, and router 130 is a network device between servers 110 and 120. The network may generally be a wide area network (WAN), such as the Internet, or a local area network (LAN), such as a network within a data center. In one embodiment, servers 110 and 120 may be virtual appliances. Virtual appliances are pre-configured virtual machines (VMs) with software appliances installed therein. For example, servers 110 and 120 may be gateway virtual appliances in a hybrid cloud computing system, with one of the virtual appliance servers running in the cloud and the other virtual appliance server running in an on-premise data center. In such a case, clients in the cloud may connect to the server running in the data center, and clients in the data center may connect to the server running in the cloud, to communicate with each other. Alternatively, servers 110 and 120 may be physical servers. Although two servers 110 and 120 are shown, it should be understood that techniques disclosed herein may also be employed in systems with more than two servers. Further, servers 110 and 120 are used herein as examples of FOU tunnel endpoints, but it should be understood that techniques disclosed herein are also applicable to other types of endpoints, such as personal computers (PCs), smart phones, tablets, and the like.

In one embodiment, router 130 is a gateway device that joins an internal private network with a public network such as the Internet. As shown, router 130 implements a firewall 135 which controls connections and data transmissions that are allowed based on a set of rules. Illustratively, router 130, or firewall 135, performs source network address translation. As described, SNAT is a technique of dynamically translating source IP addresses and/or source ports in packet headers to other IP addresses and/or ports. Illustratively, packet 115 that is transmitted from server 110 to server 120 through FOU tunnel 140 includes a header with source IP address A, source port S, destination IP address B, and destination port T. Router 130 modifies packet 115 to become packet 115' that includes a header with source IP address A', source port S', destination IP address B, and destination port T. NAT has a number of advantages, including hiding internal private IP addresses and allowing multiple devices to share the same public IP address while using different ports. For example, a server other than server 110 may also have its source IP address translated to A' but use a different port than S'.

As FOU tunnel 140 is stateless and lacks a control plane, server 120 is traditionally unable to recognize SNATing and respond back to server 110 using IP address A' and port S'. Instead, FOU tunnels are statically configured according to, e.g., configuration information received from a management application (not shown), which could also be used to create servers 110 and 120 in the case where servers 110 and 120 are virtual appliances. For example, configuration information specifying source IP address A, source port S, destination IP address B, and destination port T for FOU tunnel 140 and source IP address B, source port T, destination IP address A, and destination port S for FOU tunnel 150 may be received from the management application and used configure to configure FOU tunnels 140 and 150, respectively, on both servers 110 and 120. Although two FOU tunnels 140 and 150 are shown for illustrative purposes, it should be understood that techniques disclosed herein for detecting SNATing and dynamically creating tunnels can also be applied to systems with more than two tunnels between endpoints. In a particular embodiment, FOU tunnels 140 and 150 may also be used to wrap Internet Protocol Security (IPSec) tunnels such that multiple IPSec tunnels go into each FOU tunnel at server 110 and come out at server 120 (or vice versa). In such a case, for each of FOU tunnel 140 and 150, a configuration engine in server 120 may create an IP rule and route to reach an IP address of the remote side, as well as an IP rule and route to use the FOU tunnel for the multiple (e.g., 5) IPSec tunnel IPs. Performance parallelism is gained by using multiple IPSec tunnels. Each of FOU tunnel 140 and 150 can then provide bundling and abstraction of IPSec tunnels, requiring only one public IP address for the FOU tunnel on each side and permitting the IPSec tunnels to use private IP spaces.

With the statically configured source IP address A, source port S, destination IP address B, destination port T for FOU tunnel 140 and source IP address B, source port T, destination IP address A, destination port S for FOU tunnel 150, packets sent from server 120 through FOU tunnel 150 and including destination IP address A and destination port S will not be recognized by firewall 135 and will be dropped. The dropping of such packets sent through FOU tunnel 150 is shown in FIG. 1A. For example, server 120 may send pings through FOU tunnel 150 to attempt to establish a connection with server 110, but those ping packets will be dropped by firewall 135 and server 120 will not receive a response. It should be understood that, however, that without firewall 135, packets having destination IP address A and destination port S would be able to reach server 120.

FIG. 1B illustrates the learning of IP address A' and source port S', according to an embodiment, that allows server 120 to create a new FOU tunnel 160 through which server 120 can communicate with server 110. In one embodiment, a NAT detection application running in server 120 is configured to receive traffic flow events from a connection tracking application. For example, the Linux® conntrack tools may be used to detect incoming traffic flows in a particular embodiment, and the NAT detection application may listen to such incoming traffic flows. In such a case, the conntrack tool may be used to listen for flow events ADD and DESTROY.

The NAT detection application determines whether the source IP address and source port detected by the connection tracking application for the traffic flows matches what is expected for previously configured FOU tunnel(s). As shown, server 120 may receive ping packets, such as packet 115, through FOU tunnel 140, and packet 115 includes a header with source IP address A', source port S', destination IP address B, destination port T. In such a case, the NAT detection application may determine that destination IP address B and destination port T match the local FOU tunnel 140 endpoint (i.e., server 120), but source IP address A' and source port S' do not match the configured source IP address A and source port S for FOU tunnel 140. In response, the NAT detection application creates a new FOU tunnel 160 with source IP address B, source port T, and the detected IP address A' and port S' as the destination IP address and destination port, respectively. That is, the NAT detection application discovers the SNAT and, in response, dynamically creates FOU tunnel 160 toward the detected source IP address and source port. When packets are then sent through FOU tunnel 160, router 130 will convert, based on its routing table, destination IP address A' and destination port S' in those packets to IP address A and port S. As a result, the packets sent through FOU tunnel 160 are able to pass through firewall 135 and reach server 110. That is, the packets with destination IP address A' and destination port S' go through the hole previously punched in firewall 135 to reach server 110 with IP address A and port S.

In one embodiment, the NAT detection application may first check that the number of FOU tunnels dynamically created is less than a predefined limit prior to creating another new FOU tunnel. Limiting the number of dynamical tunnels can help ensure that spoofed packets do not overwhelm the system.

In another embodiment, the NAT detection application employs a one-way ping (owamp) probe to authenticate servers 110 and 120 to each other after a dynamic FOU tunnel is created. Owamp is an application that can be used to determine one-way latency of IP tunnels, as well as to authenticate tunnel endpoints. Authentication in particular is based on a shared ID and shared secret used to derive symmetric advanced encryption standard (AES) keys. For example, server 110 may respond to an owamp probe from server 120 that includes an identifier (ID) of server 120 by providing server 110's own ID, and, in turn, the NAT detection application running in server 120 may associate IP address A' and port S' in the packet header with server 110, as identified by its ID. In an alternative embodiment, another application running on top of FOU may be responsible for sending the IDs of servers 110 and 120 so that each can be authenticated. After servers 110 and 120 are authenticated, the NAT detection application causes the newly created FOU tunnel 160 to be configured for use to send traffic through. On the other hand, if authentication fails, the NAT detection application tears down FOU tunnel 160 without configuring FOU tunnel 160 for use.

Figure 2:
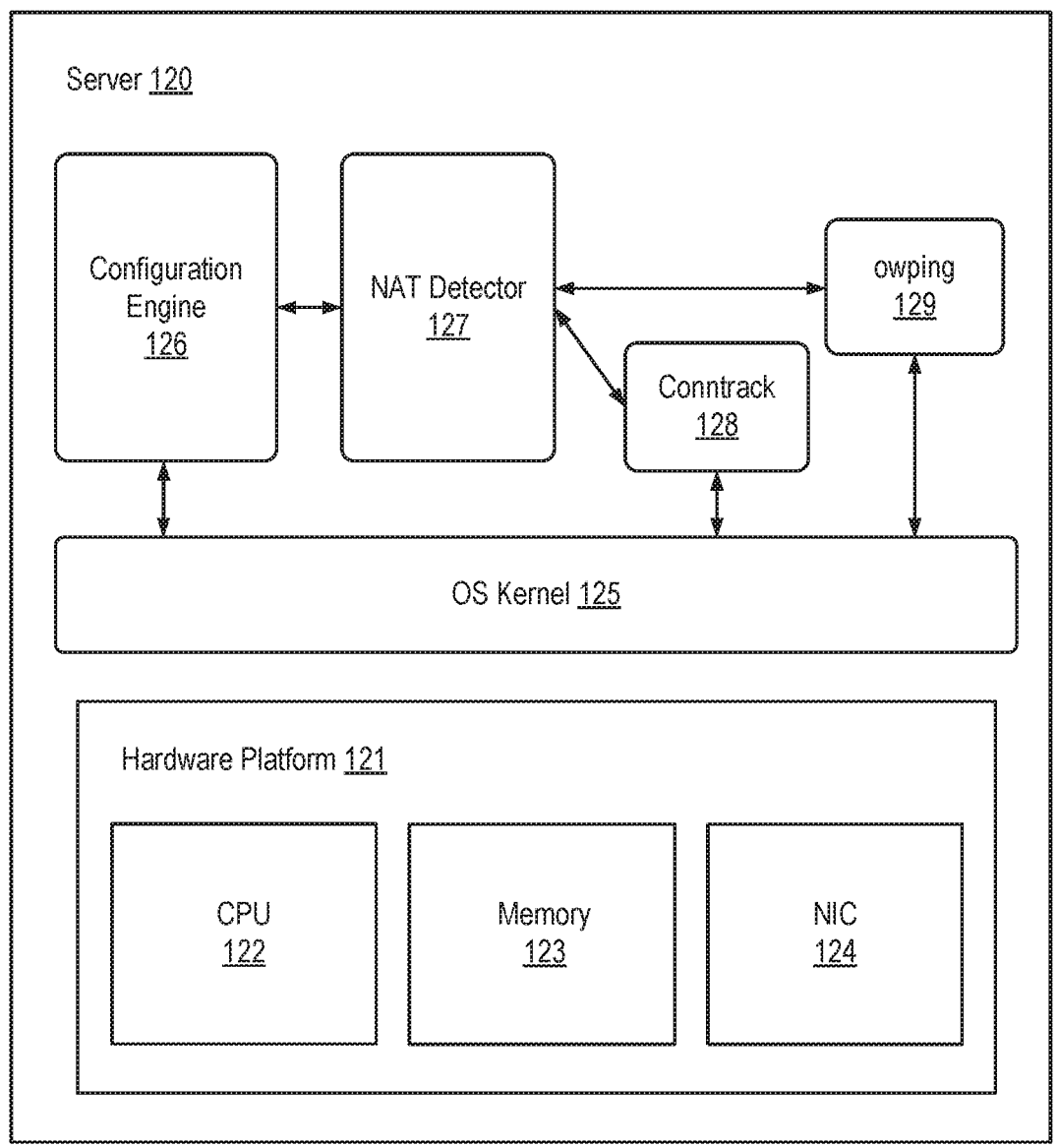
FIG. 2 illustrates in greater detail one of the servers of the computing system in FIGS. 1A-1B, according to an embodiment.

FIG. 2 illustrates in greater detail server 120 of the computing system 100 shown in FIG. 1, according to an embodiment. Although a physical server 120 is shown, it should be understood that, in an alternative embodiment, one or both endpoints may be virtual appliances running in host computer systems. As shown, server 120 is constructed on a conventional hardware platform. Illustratively, hardware 121 of server 120 includes a central processing unit (CPU) 122 that retrieves and executes programming instructions stored in a memory 123 and also stores and retrieves application data residing in memory 123. Hardware 121 further includes a network interface controller (NIC) 124 connecting server 120 to a network, such as the Internet or a local area network (LAN). In addition, hardware 121 may also include an I/O device interface (not shown) connecting I/O devices (e.g., keyboard, display and mouse devices) to server 120.

As shown, an operating system (OS) kernel 125 runs in server 120, and configuration engine 126, NAT detection 127, connection tracking 128, and owamp 119 applications run on OS kernel 125. For example, OS kernel 115 may be a Linux® kernel. Configuration engine 126 is responsible for configuring server 120 with the necessary routing and rules to forward traffic, and configuration engine 126 may also configure and manage software-defined wide area network (SD-WAN) features. In one embodiment, configuration engine 126 is configured to receive configuration information from a management application (not shown) such as information entered by a user, as well as configuration information dynamically generated in response to SNAT detection by NAT detection application 127, and create FOU tunnels according to such configuration information. In a particular embodiment, configuration engine 126 may create for each FOU tunnel an IP rule and route to reach an IP address of the remote endpoint, as well as an IP rule and route to use the FOU tunnel for multiple (e.g., 5) IPSec tunnel IPs. In addition, configuration engine 126 may be configured to, during a restart, read any existing dynamic FOU tunnels that have been programmed and determine whether those FOU tunnels are still necessary.

NAT detection application 127 is configured to provide a control plane that detects SNATing and, in response, instructs configuration engine 126 to dynamically create a new FOU tunnel back to a detected source IP address and source port. In one embodiment, NAT detection application 127 is configured to receive traffic flow events from connection tracking application 128, which is an application such as Linux® conntrack tools that detects incoming traffic flows. NAT detection application 127 listens for such incoming traffic flows and determines, for packets that connection tracking application 128 detects to have the local FOU tunnel endpoint's (i.e., server 120) destination IP address and destination port, whether the source IP address and source port of those packets matches the IP address and port of the remote FOU tunnel endpoint that has been previously configured based on, e.g., configuration information received from a management application. It should be understood that the configuration information from the management application will typically include internal IP addresses and ports of FOU tunnel endpoints, and NAT can modify those internal IP address and ports if, e.g., an endpoint is behind a firewall that changes the internal IP address and port to a public IP address and port. If NAT detection application 127 does not identify a match between the detected source IP address and source port of the new traffic flow and the expected IP address and port of previously configured FOU tunnel(s), this could be indicative of SNATing. In such a case, NAT detection application 127 transmits configuration information to configuration engine 126, which in turn configures a new FOU tunnel to the detected source IP address and source port. Pings may then be transmitted through the new FOU tunnel (e.g., every 3 seconds) to establish a connection to the remote tunnel endpoint. As described, traffic through the new FOU tunnel will be to the detected source IP address and source port, which the NAT device translates back to the internal IP address and port of the remote tunnel endpoint (e.g., server 110). Further, the remote tunnel endpoint may be authenticated using, e.g., owamp probes, for security purposes before NAT detection application 127 calls configuration engine 126 to configure the new FOU tunnel for use to transmit data. In addition, NAT detection application 127 may only create up to a limited number of dynamic FOU tunnels to, e.g., help ensure that spoofed packets do not overwhelm the system.

Owamp application 119 is a probing application that is configured to send end-to-end pings from server 120 to server 110 through FOU tunnels so as to, among other things, authenticate the servers 110 and 120 to each other after a dynamic FOU tunnel is created in response to the detection of NAT by NAT detection application 127. As described, such authentication may be based on a shared ID and shared secret used to derive symmetric advanced encryption standard (AES) keys. Returning to the example discussed above with respect to FIGS. 1A-1B, owamp application 119 may transmit a probe packet that includes an identifier (ID) of server 120 to server 110, and in turn server 110 may respond with a packet that includes server 110's own ID. NAT detection application 127 is then able to associate IP address A' and port S' in the header of the response packet from server 110 with server 110 based on its ID. In an alternative embodiment, an application other than owamp that runs on top of FOU may be used to send the IDs of servers 110 and 120 to each other for authentication purposes. Once the remote tunnel endpoint has been authenticated, the new FOU tunnel may be configured for use to transmit data.

Figure 3:
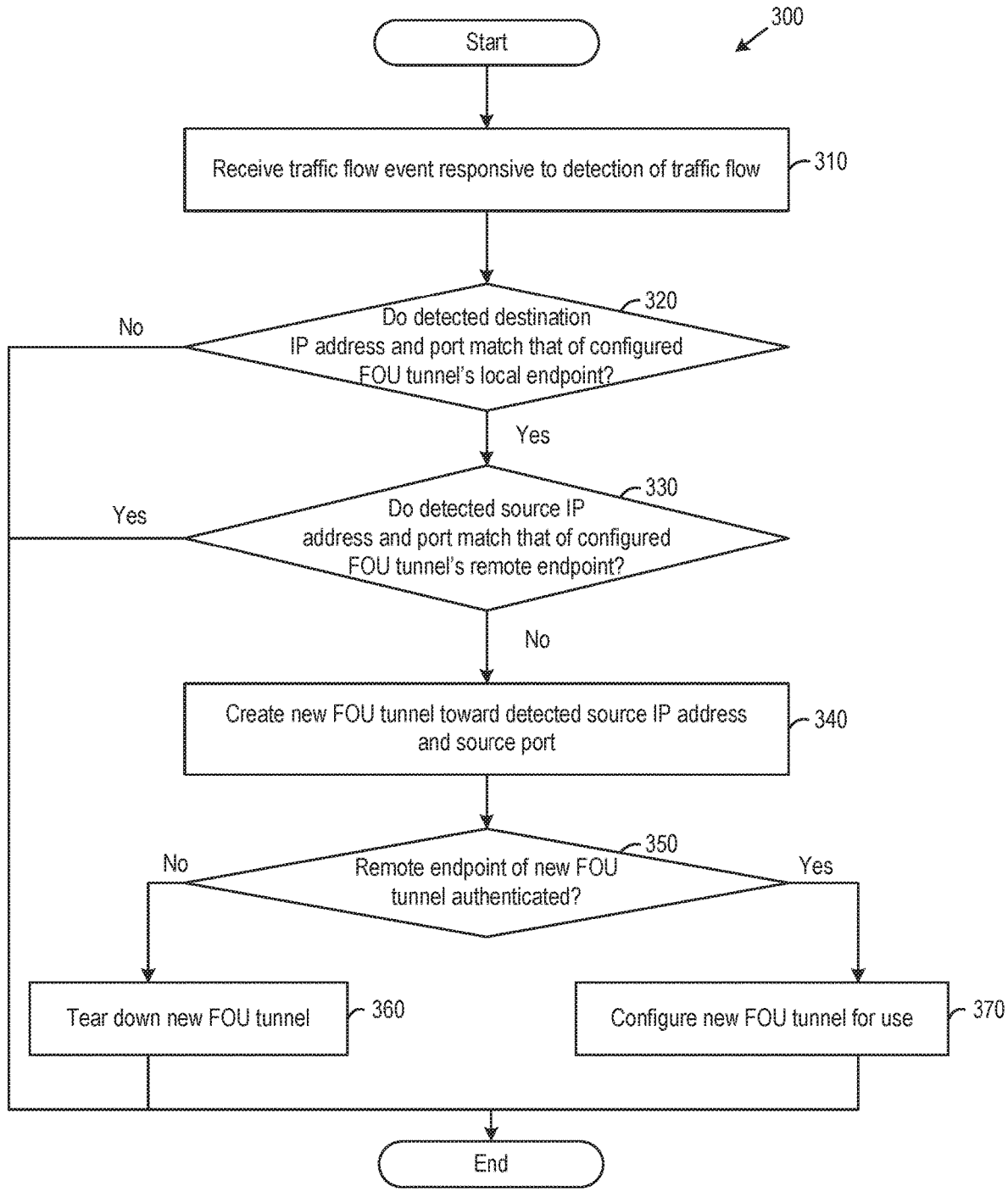
FIG. 3 is a flow diagram depicting a method of detecting source network address translation and creating a dynamic tunnel in response, according to an embodiment.

FIG. 3 is a flow diagram depicting a method 300 of detecting source network address translation and creating a dynamic tunnel in response, according to an embodiment. Although method 300 is shown as proceeding from step 310 to steps 360 or 370 and ending thereafter, it should be understood that SNAT detection and dynamic tunnel creation may generally be performed continuously to account for dynamic changes in the network. In particular, even if no SNAT is detected for a FOU tunnel, the steps of method 300 may continue to be performed.

As shown, method 300 begins at step 310, where NAT detection application 127 receives a traffic flow event responsive to connection tracking application 128's detection of a new traffic flow. As described, a remote endpoint (e.g., server 110) may send pings through a FOU tunnel (e.g., FOU tunnel 140) in order to establish a connection.

Connection tracking application 128 will detect such pings as new incoming traffic flows and, in response, generate corresponding events that NAT detection application 127 listens for. For example, connection tracking application 128 may use a Linux® conntrack tool to listen for flow events ADD and DESTROY with the conntrack tool.

At step 320, NAT detection application 127 determines whether a detected destination IP address and destination port of the traffic flow matches that of the local endpoint of a previously configured FOU tunnel. If the destination IP address and destination port of the traffic flow does match that of the local endpoint, then at step 330, NAT detection application 127 determines whether the detected source IP address and source port of the traffic flow matches that of the configured FOU tunnel. That is, NAT detection application 127 examines the tuple comprising the destination IP address, destination port, source IP address, and source port tuple of new traffic flow packets and determines whether the source IP address and/or source port are different from those of previously configured FOU tunnel(s), indicating that the source IP address and/or source port have been changed due to SNAT.

If the detected source IP address and source port do not match that of a previously configured FOU tunnel, then at step 340, NAT detection application 127 creates a new FOU tunnel toward the detected source IP address and source port. As described, to create the new FOU tunnel, NAT detection application 127 may transmit configuration information specifying, among other things, that the detected source IP address and source port are the destination IP address and destination port of the new FOU tunnel to configuration engine 126, which in turn configures the new FOU tunnel based on such configuration information. The destination IP address and destination port of packets sent through such a FOU tunnel will then be converted back to the internal IP address and port of the remote tunnel endpoint such that the endpoint can be reached through a firewall.

In one embodiment, NAT detection application 127 may check that the number of dynamically created tunnels is less than a predefined limit prior to creating the new FOU tunnel at step 340. As described, limiting the number of dynamical tunnels that can be created can help ensure that spoofed packets do not overwhelm the system.

At step 350, NAT detection application 127 authenticates the remote tunnel endpoint. As described, NAT detection application 127 may employ probes such as owamp that provide the ability to authenticate peers in one embodiment. In such a case, the remote tunnel endpoint may be provided with an ID of the local tunnel endpoint (e.g., server 120) using an owamp probe and respond with its own ID (e.g., the ID of server 110), and such IDs may then be used by each of the tunnel endpoints to authenticate the other. In an alternative embodiment, another application running on top of FOU may be responsible for sending the IDs of the tunnel endpoints so that each can be authenticated.

If the remote tunnel endpoint is not authenticated, then at step 360, NAT detection application 127 tears down the newly created FOU tunnel. On the other hand, if the remote tunnel endpoint is authenticated, then at step 370, NAT detection application 127 configures the newly created FOU tunnel for use. As described, NAT detection application 127 may call configuration engine 126 to use the newly created FOU tunnel. That is, the newly created FOU tunnel is only configured for use to send traffic after the remote tunnel endpoint is successfully authenticated using, e.g., owamp probes. Prior to such authentication, the newly created FOU tunnel is not configured for use. In an embodiment in which the FOU tunnel is used to wrap IPSec tunnels, IKE traffic may also use the newly authenticated FOU tunnel to negotiate IPSec tunnels.

Advantageously, techniques disclosed herein provide a lightweight control plane for stateless unidirectional IP tunnels that traditionally lack a control plane, such as FOU tunnels. By detecting source network address translation and dynamically creating a new tunnel back to the detected source IP address and source port, remote endpoints that are behind firewalls can be reached. In addition, a bidirectional flow can be created that binds two unidirectional tunnels, including the dynamically created new tunnel, into one.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operation system in which at least one application runs. It should be noted that these embodiments may also apply to other examples of contexts, such as containers not including a guest operation system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespace and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. At an endpoint having a first tunnel configured to receive communication from another endpoint, a method for dynamically creating a second tunnel, comprising:
    determining at least one of a source Internet Protocol (IP) address or a source port associated with a traffic flow received from a remote endpoint does not match a source IP address or a source port, respectively, of the first tunnel;
    further determining a destination IP address associated with the detected traffic flow corresponds to the endpoint having the first tunnel configured to receive communication from the other endpoint;
    responsive to the determining and the further determining, creating the second tunnel to the remote endpoint, wherein packets transmitted through the second tunnel are encapsulated with a header which includes the source IP address associated with the traffic flow as a destination IP address and the source port associated with the traffic flow as a destination port; and
    authenticating the remote endpoint.

2. The method of claim 1, wherein each of the first and the second tunnels is a stateless unidirectional tunnel not associated with a control plane.

3. The method of claim 2, wherein the stateless unidirectional tunnels are Foo-over-UDP (FOU) tunnels.

4. The method of claim 1, wherein:
    the traffic flow is detected based on at least one or more received ping packets; and
    the source IP address and the source port associated with the detected traffic flow are determined by inspecting headers of the received ping packets.

5. The method of claim 1, further comprising, determining a destination port associated with the detected traffic flow corresponds to the endpoint having the first tunnel configured to receive communication from the other endpoint.

6. The method of claim 1, further comprising:
    if the remote endpoint is authenticated:
        configuring the second tunnel for use, and
        transmitting data through the second tunnel; and
    if the remote endpoint is not authenticated, tearing down the second tunnel.

7. The method of claim 1, wherein the remote endpoint is authenticated using one or more one-way ping (owamp) probes.

8. The method of claim 1, wherein the second tunnel is created subsequent to determining that a number of previously created tunnels is less than a predefined limit.

9. The method of claim 1, wherein the remote endpoint is a virtual appliance running in either a cloud or an on-premise datacenter.

10. A non-transitory computer-readable medium comprising instructions executable by a computer, the computer having one or more physical central processing units (CPUs), wherein the instructions, when executed, cause the computer to perform operations for creating, at an endpoint having a first tunnel configured to receive communication from another endpoint, a second tunnel, the operations comprising:
    determining at least one of a source Internet Protocol (IP) address or a source port associated with a traffic flow received from a remote endpoint does not match a source IP address or a source port, respectively, of the first tunnel;
    further determining a destination IP address associated with the detected traffic flow corresponds to the endpoint having the first tunnel configured to receive communication from the other endpoint;
    responsive to the determining and further determining, creating the second tunnel to the remote endpoint, wherein packets transmitted through the second tunnel are encapsulated with a header which includes the source IP address associated with the traffic flow as a destination IP address and the source port associated with the traffic flow as a destination port; and
    authenticating the remote endpoint.

11. The computer-readable medium of claim 10, wherein each of the first and the second tunnels is a stateless unidirectional tunnel not associated with a control plane.

12. The computer-readable medium of claim 11, wherein the stateless unidirectional tunnels are Foo-over-UDP (FOU) tunnels.

13. The computer-readable medium of claim 10, wherein:
the traffic flow is detected based on at least one or more received ping packets; and
the source IP address and the source port associated with the detected traffic flow are determined by inspecting headers of the received ping packets.

14. The computer-readable medium of claim 10, the operations further comprising, determining a destination port associated with the detected traffic flow corresponds to the endpoint having the first tunnel configured to receive communication from the other endpoint.

15. The computer-readable medium of claim 10, further comprising:
if the remote endpoint is authenticated:
configuring the second tunnel for use, and
transmitting data through the second tunnel; and
if the remote endpoint is not authenticated, tearing down the second tunnel.

16. The computer-readable medium of claim 10, wherein the remote endpoint of the created second tunnel is authenticated using one or more one-way ping (owamp) probes.

17. The computer-readable medium of claim 10, wherein the second tunnel is created subsequent to determining that a number of previously created tunnels is less than a predefined limit.

18. The computer-readable medium of claim 10, wherein the remote endpoint is a virtual appliance running in either a cloud or an on-premise datacenter.

19. A system, comprising:
a processor; and
a memory, wherein the memory includes a program for creating, at an endpoint having a first tunnel configured to receive communication from another endpoint, a second tunnel, the program being configured to perform operations comprising:
determining at least one of a source Internet Protocol (IP) address or a source port associated with a traffic flow received from a remote endpoint does not match a source IP address or a source port, respectively, of the first tunnel,
further determining a destination IP address associated with the detected traffic flow corresponds to the endpoint having the first tunnel configured to receive communication from the other endpoint,
responsive to the determining and the further determining, creating the second tunnel to the remote endpoint, wherein packets transmitted through the second tunnel are encapsulated with a header which includes the source IP address associated with the traffic flow as a destination IP address and the source port associated with the traffic flow as a destination port, and
authenticating the remote endpoint.

20. The system of claim 19, wherein each of the first and the second tunnels is a stateless unidirectional tunnel not associated with a control plane.

\* \* \* \* \*